US009008624B2

(12) United States Patent
Michau et al.

(10) Patent No.: US 9,008,624 B2
(45) Date of Patent: Apr. 14, 2015

(54) METHOD OF AUTHENTICATING A FIRST AND A SECOND ENTITY AT A THIRD ENTITY

(75) Inventors: Benoit Michau, Paris (FR); Matthew Robshaw, Seattle, WA (US)

(73) Assignee: France Telecom, Paris (FR)

( * ) Notice: Subject to any disclaimer, the term of this patent is extended or adjusted under 35 U.S.C. 154(b) by 98 days.

(21) Appl. No.: 13/977,872

(22) PCT Filed: Dec. 22, 2011

(86) PCT No.: PCT/FR2011/053143
§ 371 (c)(1),
(2), (4) Date: Oct. 29, 2013

(87) PCT Pub. No.: WO2012/089967
PCT Pub. Date: Jul. 5, 2012

(65) Prior Publication Data
US 2014/0057601 A1    Feb. 27, 2014

(30) Foreign Application Priority Data

Dec. 30, 2010  (FR) ..................... 10 61367

(51) Int. Cl.
| H04M 1/66 | (2006.01) |
| H04W 12/06 | (2009.01) |
| H04L 9/32 | (2006.01) |
| H04W 88/02 | (2009.01) |

(52) U.S. Cl.
CPC .............. *H04W 12/06* (2013.01); *H04L 9/321* (2013.01); *H04L 9/3271* (2013.01); *H04L 9/3247* (2013.01); *H04W 88/02* (2013.01); *H04L 2209/805* (2013.01)

(58) Field of Classification Search
None
See application file for complete search history.

(56) References Cited

U.S. PATENT DOCUMENTS

| 5,790,667 | A | 8/1998 | Omori et al. |
| 7,096,494 | B1 | 8/2006 | Chen |
| 2003/0233546 | A1 | 12/2003 | Blom |
| 2005/0108534 | A1* | 5/2005 | Bajikar et al. ................ 713/172 |
| 2008/0052769 | A1* | 2/2008 | Leone et al. ..................... 726/7 |
| 2008/0208753 | A1 | 8/2008 | Lee et al. |

OTHER PUBLICATIONS

International Search Report and Written Opinion dated Mar. 19, 2012 for corresponding International Application No. PCT/FR2011/053143, filed Dec. 22, 2011.

(Continued)

*Primary Examiner* — Erika A Washington
(74) *Attorney, Agent, or Firm* — David D. Brush; Westman, Champlin & Koehler, P.A.

(57) ABSTRACT

A method is provided for authenticating a first entity and a second entity at a third entity. The first and third entities share a first secret key, and the second and third entities share a second secret key. The method includes steps of: dispatching by the third entity to the first entity of a challenge, calculation by the first entity, using the first secret key, of an authentication value; dispatching by the first entity to the second entity the authentication value, calculation by the second entity, using the second secret key, of an authentication response; dispatching by the second entity to the third entity of the authentication response; calculation by the third entity of an expected authentication response; and comparison of the authentication response received with the expected calculated authentication response.

11 Claims, 2 Drawing Sheets

(56) References Cited

OTHER PUBLICATIONS

3GPP, "3rd Generation Partnership project; Technical Specification Group TSG SA; Feasibility Study on LTE Relay Node Security Release 10", 3GPP Draft; S3-101404__ATT__Change-Bars, 3rd Generation Partnership Project (3GPP), Mobile Competence Centre; 650, Route Des Lucioles; F-06921 Sophia-Antipolis Cedex; France, vol. SA WG3, No. Sorrento; 20101115, Dec. 3, 2010, XP050526257.

French Search Report and Written Opinion dated Sep. 23, 2011 for corresponding French Application No. 1061367, filed Dec. 30, 2010.
International Preliminary Report on Patentability and English translation of the Written Opinion dated Jul. 2, 2013 for corresponding International Application No. PCT/FR2011/053143, filed Dec. 22, 2011.

* cited by examiner

METHOD OF AUTHENTICATING A FIRST AND A SECOND ENTITY AT A THIRD ENTITY

CROSS-REFERENCE TO RELATED APPLICATIONS

This Application is a Section 371 National Stage Application of International Application No. PCT/FR2011/053143, filed Dec. 22, 2011, which is incorporated by reference in its entirety and published as WO 2012/089967 on Jul. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention relates to a method for authenticating at least two separate entities with a third entity.

More precisely, the invention allows the authentication of a plurality of entities that communicate with a central entity through a communication channel that is reduced in terms of bandwidth and number of interchanged messages.

The invention can be applied particularly advantageously in the field of mobile telecommunications, notably in the case in which an operator wishes to authenticate a device of "SIM" card or "USIM" card (from the English "(Universal) Subscriber Identity Module") type or a terminal that houses this card. Such authentication makes it possible to ensure that the card and the terminal are associated and can only be used together. This scenario is all the more interesting since more and more equipment is developed to use the mobile network without the presence of a physical user attending to the security of this equipment. This is the case, by way of example, with network equipment such as "LTE" (from the English "Long Term Evolution") relays that are intended to extend the radio network while operating in a similar manner to a mobile terminal, or "M2M" (for "Machine To Machine") equipment that is used for remote maintenance applications or remote alarm applications, for example.

BACKGROUND OF THE DISCLOSURE

By way of example, an M2M application installed on a piece of M2M equipment uses a mobile operator network to allow a central server to interchange information remotely with this piece of equipment, in order to collect information stored on this equipment or to modify the state thereof without human intervention and especially without continuous human surveillance of the M2M equipment. To implement these interchanges of information for the mobile network, the equipment is provided with a card of USIM card type. M2M equipment, in the same way as a mobile subscriber terminal, is subjected to authentication from the network. More precisely, the USIM card is authenticated by the network on the basis of known authentication algorithms. However, in current network authentication procedures, the mobile equipment associated with the USIM card is not authenticated, either by the network or by the USIM card. It thus cannot be considered to be a piece of trustworthy equipment by the mobile network infrastructure.

Proposals have been made to overcome this problem. By way of example, the 3GPP document http://www.3gpp.org/ftp/tsg_sa/WG3_Security/TSGS3_61_Sorrento/DOcs/S3-101404.zip proposes a scheme for authenticating a USIM card in association with a mobile terminal into which the USIM card has been inserted. On the basis of this scheme, the network and the USIM card share an authentication key K in conventional fashion and the network and the terminal share a symmetrical key $K_{terminal}$. The authentication is thus performed according to the following steps:

- the network sends a RAND challenge to the USIM card in conventional fashion,
- the USIM card calculates a response by applying a known authentication algorithm F2 to the RAND challenge parameterized by the key K; it transmits the response to the terminal,
- the terminal calculates a signature for this response using the symmetrical key belonging to the terminal $K_{terminal}$ in order to produce a new response to the RAND challenge,
- the new response is sent to the network,
- the network can thus authenticate the terminal and the USIM card by verifying the signature of the received response, and the response as such.

However, in the event of failure of the authentication by the network, this solution does not allow identification of whether the authentication error stems from the USIM card, from the terminal or from the two.

SUMMARY

The aim of the invention is to improve the situation by proposing a method for authenticating a first entity and a second entity by means of a third entity, said first and third entities sharing a first secret key, said second and third entities sharing a second secret key, wherein the method comprises steps:

- of the third entity sending the first entity a challenge,
- of the first entity using the first secret key to calculate an authentication value on the basis of the received challenge,
- of the first entity sending the second entity the calculated authentication value,
- of the second entity using a cipher algorithm parameterized by the second secret key to calculate an authentication response, on the basis of a token that is known to the third entity and to the second entity and on the basis of the authentication value received from the first entity,
- of the second entity sending the third entity the authentication response,
- of the third entity using the first and second secret keys to calculate an expected authentication response, on the basis of the token and the challenge,
- of the received authentication response being compared with the calculated expected authentication response.

Thus, the method according to the invention allows the authentication of two different entities that communicate in the course of one and the same authentication operation. The two authenticated entities are thus associated in the sense that the authentication thereof is performed jointly by the third entity.

Thus, this authentication makes it possible to ensure that the authenticated entities work together. By way of example, in the event of authentication of two entities in a mobile network in which the first entity is a SIM card, or a USIM card, and the second entity is a terminal into which the (U)SIM card has been inserted, the authentication makes it possible to ensure that the (U)SIM card has indeed been inserted into the mobile terminal and only works with the terminal. This aspect is of interest in terms of security in the case of M2M equipment or LTE relays that have no human surveillance.

Moreover, the method of the invention makes it possible to reuse communication channels and interfaces initially defined for the authentication of a single entity. It is thus not necessary to modify interfaces and to define new messages between the third entity in charge of the authentication and the two authenticated entities. This aspect is of interest in the event of authentication of two entities in a mobile network, for example. This is because developing an interface in the network may be long-term work. Generally, the method minimizes the messages interchanged between the third entity in charge of the authentication and the two entities to be authenticated, since the number of messages interchanged between the third entity and the two entities is identical to the number of messages interchanged when a single entity is authenticated.

Moreover, the invention makes it possible, upon failure of the authentication of one of the two entities, to identify which of the two has failed. This aspect is made possible firstly by the use of a cipher algorithm for the authentication and secondly by the sharing of respective secret keys between an entity to be authenticated and the third entity, and of a token that is known to the second and third entities.

The invention also relates to a method for authenticating a first and a second entity by means of a third entity, said first and third entities sharing a first secret key, said second and third entities sharing a second secret key, wherein the method comprises steps:
  of sending the first entity a challenge,
  of using the first and the second secret key to calculate an expected authentication response, on the basis of a token that is known to the third entity and to the second entity and on the basis of the challenge,
  of receiving a response to said challenge from the second entity,
  of comparing the received response with the calculated authentication response.

The invention likewise relates to a method for authenticating a group made up of at least two entities with a third entity, the third entity and a first entity from the group sharing a first secret key, the third entity and a second entity from the group sharing a second secret key, wherein said method comprises the steps:
  of a challenge being received from the central entity,
  of the first entity from the group using the first secret key to calculate an authentication value on the basis of the received challenge,
  of the first entity sending the second entity from the group the calculated authentication value,
  of the second entity from the group using a cipher algorithm parameterized by the second secret key to calculate an authentication response, on the basis of a token that is known to the third entity and to the second entity and on the basis of the authentication value received from the first entity,
  of the second entity from the group sending the third entity the calculated authentication response.

In one exemplary embodiment, if the received authentication response is not equal to the calculated response, the method likewise comprises the following steps, implemented by the third entity:
  deciphering of the received authentication response using the second secret key,
  verification that the deciphered response comprises the token.

If the verification is positive, the method likewise comprises calculation of an expected value on the basis of the challenge and the first secret key, and verification that the deciphered response comprises the expected value.

Thus, when the authentication has failed, the method allows precise identification of the entity that has failed. Thus, it is possible, in the event of failure of the authentication, to ascribe the authentication error to the second entity or, if the second entity has been authenticated correctly, to the first entity.

In one exemplary embodiment, the token comprises a plurality of padding bits.

In another exemplary embodiment, the token comprises part of the challenge.

In this embodiment of the invention, the security of the authentication method is increased since the token varies from one authentication to another.

The invention likewise relates to an authentication device suitable for authenticating a first and a second entity, said device sharing a first secret key with the first entity, and a second secret key with the second entity, wherein said device comprises:
  sending means, designed to send a challenge to the first entity,
  calculation means, designed to calculate an expected authentication response using the second secret key, on the basis of a token that is known to the authentication device and to the second entity, and a signature for the challenge using the first secret key,
  reception means, designed to receive a response to said challenge from the second entity,
  comparison means, designed to compare the received response with the calculated authentication response.

The invention also relates to a set of two entities comprising a first and a second entity, said set being suitable for being authenticated by an authentication device according to the invention, the authentication device sharing a first secret key with the first entity and a second key with the second entity, wherein said set comprises:
  reception means, designed to receive a challenge from the authentication device,
  first calculation means designed so that the first entity from the group uses the first secret key to calculate an authentication value on the basis of the challenge,
  transmission means, designed so that the first entity transmits the authentication value to the second entity from the group,
  second calculation means, designed so that the second entity uses a cipher algorithm parameterized by the second secret key to calculate an authentication response, on the basis of a token that is known to the authentication device and to the second entity and on the basis of the authentication value received from the first entity in the set,
  sending means, designed to send the authentication device the calculated authentication response.

The invention also relates to an authentication system comprising:
  an authentication device according to the invention, and
  a set of two entities according to the invention.

The invention likewise relates to a computer program on a data storage medium and able to be loaded into the internal memory of an authentication device, the program comprising code portions for executing the steps of the authentication method that are executed by the device when the program is executed on said device.

The invention also relates to a data storage medium on which the computer program according to the invention is recorded.

BRIEF DESCRIPTION OF THE DRAWINGS

Numerous details and advantages of the invention will be better understood upon reading the description of a particular embodiment with reference to the appended diagrams, which are provided in nonlimiting fashion and in which.

DETAILED DESCRIPTION OF ILLUSTRATIVE EMBODIMENTS

Figure 1:
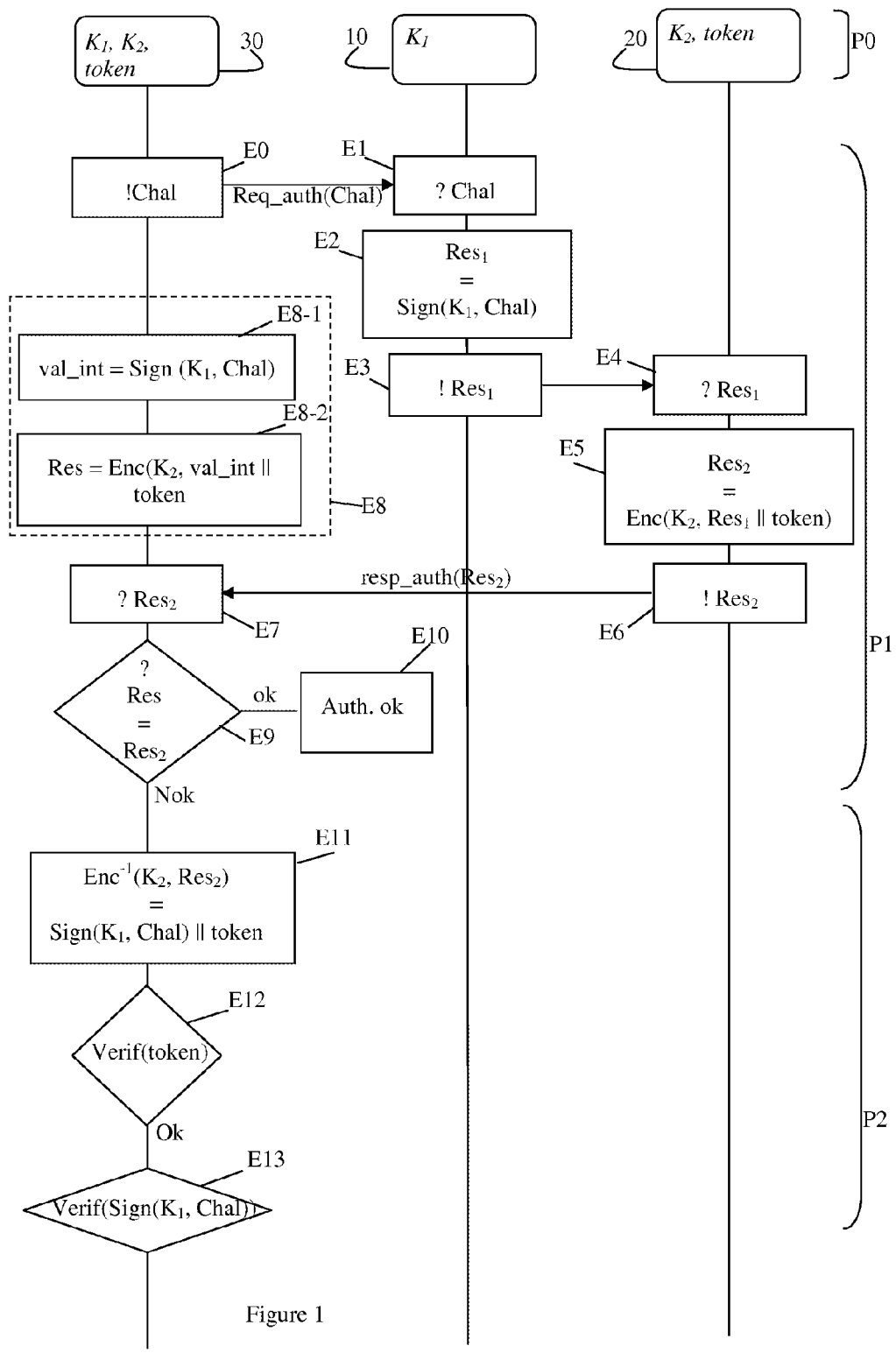
FIG. 1 describes the steps of the method for authenticating two entities with a third entity, according to a first particular embodiment of the invention.

The method for authenticating two entities with a third entity will now be described with reference to FIG. 1.

A first entity 10 and a second entity 20 are capable of being authenticated by a third entity 30 in the course of one and the same authentication operation. In an embodiment that is described here, the third entity 30 is a mobile communication network, such as the "GSM" (for "Global System for Mobile communications") network, or the "GPRS" (from the English "General Packet Radio Service") network. In this case, the third entity 30 is an authentication center in the network, for example. The first entity 10 is a subscriber identity card of "SIM" card or "USIM" (from the English "(Universal) Subscriber Identity Module") card type, for example, and the second entity 20 is a mobile terminal into which the subscriber card has been inserted, for example.

In an initial configuration phase P0, a certain number of parameters intended to be used next when the first and second entities 10, 20 are authenticated with the third entity 30 is defined. The configuration phase P0 is executed only once. In the course of this configuration phase P0, a first secret key $K_1$ is shared between the first entity 10 and the third entity 30. Equally, a second secret key $K_2$ is shared between the second entity 20 and the third entity 30. Moreover, during this initial configuration phase P0, knowledge of a token is shared between the second entity 20 and the third entity 30. The token is a digital data item, which may be fixed or variable. The token is a data item that the second entity 20 and the third entity 30 are able to obtain. By way of example, the token corresponds to a plurality of padding bits '0x00'.

Once the configuration phase P0 has been executed, a subsequent authentication phase P1 can take place. The authentication phase P1 is executed as many times as is necessary in order for the third entity 30 to jointly authenticate the first and second entities 10, 20. The subsequent steps E0 to E10 describe the authentication phase P1.

In an initial step E0 for sending an authentication request, the third entity 30 sends an authentication request message req_auth to the first entity 10. The authentication request message comprises a challenge Chal. The challenge Chal is a random value chosen by the third entity 30 for the current authentication phase P1. The request message, and thus the challenge Chal, is received by the first entity 10 in the course of a step E1 for receiving the challenge.

In a step E2 for calculating an authentication value, the first entity 10 calculates an authentication value $Res_1$, on the basis of the challenge Chal and the secret key $K_1$ shared with the third entity 30. By way of example, the first entity 10 calculates the authentication value by applying a signature algorithm to the challenge Chal, parameterized by the shared first secret key $K_1$. In other words, $Res_1 = Sign(K_1, Chal)$; where Sign is a known signature algorithm, for example an "MAC" (from the English "Message Authentication Code") algorithm. In the case of GSM networks, it is the algorithm A3 that is used. In a sending step E3, the authentication value $Res_1$ is transmitted by the first entity 10 to the second entity 20.

In a reception step E4, the second entity 20 receives the authentication value $Res_1$ from the first entity 10.

In a step E5 for calculating an authentication response, the second entity 20 calculates an authentication response $Res_2$. To this end, the second entity 20 applies a cipher algorithm Enc, parameterized by the shared second secret key $K_2$, to the authentication value $Res_1$ received from the first entity 10 and concatenated with the token. The token is known to the third entity 30 and to the second entity 20. In other words, $Res_2 = Enc(K_2, Res_1 \| token)$; where Enc is a known cipher algorithm. By way of example, the cipher algorithm Enc is the "AES" (for "Advanced Encryption Standard") algorithm, or the "DES" (for "Data Encryption Standard") algorithm. $Res_2$ constitutes a response to the authentication request message req_auth sent by the third entity 30 in the course of the initial step E0.

In a step E6 for sending the response, the second entity 20 sends the third entity 30 a response message resp_auth comprising the authentication response $Res_2$ calculated in the course of step E5.

In a reception step E7, the third entity 30 receives the response message resp_auth and therefore the calculated authentication response $Res_2$ from the second entity 20.

In a step E8 for calculating an expected response, the third entity 30 calculates an expected authentication response Res. To this end, in a substep E8-1 of step E8, the third entity 30 calculates an intermediate value val_int by using the same signature function as that applied by the first entity 10 in the course of step E2 for calculating an authentication value. In other words, the third entity 30 calculates val_int=$Sign(K_1, Chal)$ by applying the signature algorithm Sign, parameterized by the shared first key $K_1$, to the challenge Chal. In a subsequent substep E8-2, the third entity 30 calculates the expected authentication response Res by applying the same cipher algorithm as that used by the second entity 20 in the course of step E5 for calculating an authentication result. In other words, the third entity 30 calculates Res=$Enc(K_2, val\_int \| token)$ by applying the cipher algorithm Enc parameterized by the shared second secret key $K_2$ to the intermediate value val_int obtained during the preceding substep concatenated with the token.

It is understood that step E8 for calculating an expected result can be executed independently of the steps executed by the first and second entities 10, 20. Thus, in another embodiment of the method, step E8 is executed consecutively to step E0 for sending a challenge.

In a comparison step E9, the third entity 30 compares the expected authentication response Res, calculated in the course of step E8, with the authentication response $Res_2$ received from the second entity 20 in the course of step E7.

If the comparison is positive (ok branch in FIG. 1), that is to say if the calculated authentication response Res is equal to the authentication response $Res_2$ received from the second entity 20, then the authentication of the first and second entities has been successful. The two entities have thus been correctly authenticated in the course of one and the same authentication phase. The third entity 30 is then in a successful authentication state E10.

If the comparison is negative (Nok branch in FIG. 1) then an analysis is performed in the course of an analysis phase P2 in order to determine if the authentication error stems from the second entity 20 or, if the authentication of the second entity 20 has been successful, from the first entity 10.

Thus, in a deciphering step E11, the third entity 30 deciphers the authentication response Res$_2$ received from the second entity 20 using the shared second secret key K$_2$. To this end, the third entity 12 calculates Enc$^{-1}$(K$_2$, Res$_2$), where Enc$^{-1}$ represents the deciphering algorithm associated with the cipher algorithm Enc. It is noted that when the authentication is successful, the deciphered authentication response is equal to the concatenation of a first value corresponding to the signature from the challenge Chal using the shared first secret key K$_1$ with a second value corresponding to the token. In other words, in the event of successful authentication, the following equation is verified:

$$Enc^{-1}(K_2, Res_2) = Sign(K_1, Chal) \| token$$

It is noted that since the size of the token is known to the third entity 30, it is easy for the third entity 30 to distinguish the first and second values.

A step E12 for verifying the token verifies whether the token known to the second and third entities 20, 30 is indeed equal to the second value that the deciphered authentication response comprises. If the verification is positive, the second entity 20 has been correctly authenticated. If the verification is negative, that is to say if the token is not included in the deciphered authentication response, then the authentication of the second entity 20 has failed. This is because in this case, either the second entity 20 has not used the token agreed during the configuration phase P0 or it has not used the correct cipher algorithm Enc, or it has not used the shared second secret key K$_2$. In these three cases, the authentication of the second entity 20 fails.

If the verification of the token that is performed in the course of step E12 is positive (ok branch in the figure), that is to say if the authentication of the second entity 20 has been successful, then, in a subsequent signature verification step E13, the third entity 30 verifies the first part of the deciphered authentication response. Thus, the third entity 30 calculates an expected value by applying the signature algorithm Sign to the challenge Chal parameterized by the shared first secret key K$_1$. In other words, the third entity 30 calculates Sign(K$_1$, Chal). If the expected value is not equal to the first value that the deciphered authentication response comprises then the authentication of the first entity 10 has failed.

It is noted that during the analysis phase P2, it is possible to ascribe an authentication error to the second entity 20, or, if the authentication of the second entity 20 is successful, to the first entity 10.

The invention is described here within the context of authentication, by the GSM or GPRS network, of a (U)SIM card in association with a mobile terminal into which the card has been inserted. The invention is not limited to these networks, of course. Thus, the method likewise applies to authentication in other networks, for example a "UMTS" (for "Universal Mobile Telecommunication System") network. In this example, the signature algorithm implemented by the first entity 10 in order to calculate the authentication value is thus the "AKA" (from the English "Authentication Key Agreement") algorithm.

Equally, the method is not limited to authentication of a (U)SIM card and a terminal of a mobile network. More generally, the method applies to the authentication of two communicating entities by a third entity. Thus, in another exemplary embodiment, a (U)SIM card and an entity that is external to the mobile terminal, for example an "RFID" (for "Radio Frequency Identification") component attached to a product to be purchased, are authenticated jointly by a network. In this case, the terminal is suitable for operating in RFID tag reader mode. The (U)SIM card and the tag are capable of communicating via the mobile terminal. Thus, the joint authentication of the U(SIM) card and the RFID tag may correspond to the secure obtainment of a receipt validating the purchase of the product by means of the terminal. In another case of use, the second entity is associated with an external device, for example a parking meter that incorporates an "NFC" (from the English "Near Field Communication") component. The terminal plays the part of an NFC terminal, and the joint authentication of the U(SIM) card and the parking meter as an NFC card by the network validates the purchase of a parking ticket using the terminal.

It is stated that during the configuration phase P0, secret keys K$_1$, K$_2$ are distributed to the first and second entities 10, 20, respectively, each of the keys being shared with the third entity 30. In the example described here for a mobile network, the first entity is a (U)SIM card and the second entity is a terminal into which the card has been inserted. The first secret key K$_1$, usually called the authentication key, is defined and installed in the (U)SIM card during the step of manufacturing the card. The second secret key K$_2$ can be installed on the terminal once the equipment has been put in circulation. This installation can be carried out in secure fashion, for example using a public key cryptography system that is set up during manufacture of the terminal and intended to allow the secure installation of the shared second secret key K$_2$ from the third entity, or from a dedicated entity for distributing keys. In this case, the entity for distributing keys then distributes the shared second key K$_2$ to the second and third entities 20, 30.

The token, which is known to the second and third entities 20, 30, may be fixed. By way of example, as stated previously, it may consist of padding bits '0x00'. In another exemplary embodiment, the token may be variable and correspond to part of the challenge Chal sent at the start of the authentication phase. In this case, the third entity 30 and the second entity 20 agree during the configuration phase P0 what part of the challenge corresponds to the token. By way of example, it is the first x bits of the challenge that constitute the token, the last x, the first x most significant bits, etc.

The size of the token needs to be adjusted so that the security of the authentication and the maximum authorized size of the authentication result transmitted by the second entity 20 to the third entity 30 are compatible. Thus, in one exemplary embodiment corresponding to authentication in a 3$^{rd}$ generation mobile network, in which an authentication result is usually between 32 and 128 bits, it appears reasonable to have tokens of a size between 32 and 64 bits. Thus, the authentication response has a size between 64 and 96 bits. On the other hand, for reasons of compatibility with the radio interface provided by the network, the authentication response Res$_1$ calculated by the first entity 10, in this case the (U)SIM card, may be truncated. By way of example, when the (U)SIM card is configured so as to produce authentication values Res$_1$ of 128 bits, and when the radio interface with the network is thus suitable for transmitting such responses, it appears necessary to truncate the authentication value produced by the (U)SIM card in order to take account of the token. The reason is that the token is concatenated with the authentication value Res$_1$ by the second entity 20, in this case the terminal. Thus, in this example, the authentication value $Res_1$ can be truncated to 64 or 96 bits by the first entity 10, which makes it possible to use a token of 64 or 32 bits. Of course, in this case, during step E8 for calculating an expected response, the third entity 30, in this case the network, likewise truncates the intermediate value val_int that it calculates.

Figure 2:
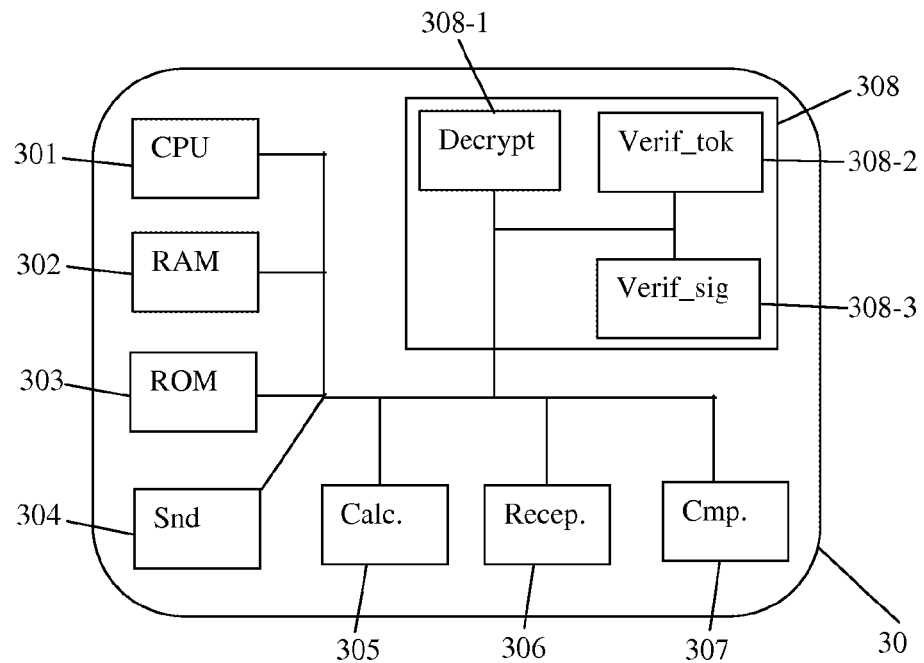
FIG. 2 shows a particular example of an authentication device capable of implementing the method from FIG. 1.

A particular example of an authentication device 30 capable of implementing the method from FIG. 1 will now be described with reference to FIG. 2. The authentication device 30 is capable of authenticating a group of at least two entities (not shown in FIG. 2). By way of example, the authentication device 30 is an authentication server for a mobile network in the case in which the method relates to the authentication of two entities by the network. In another exemplary embodiment, the authentication device is a mobile terminal, capable of authenticating a (U)SIM card and an entity that is external to the terminal.

In all these cases, the authentication device comprises:
- a processor 301, or "CPU" (from the English "Central Processing Unit"), or a processing unit. The processor 301 is linked to a set of memories:
- a random access memory 302, or "RAM", allows the performance of calculations, the loading of instructions and the execution thereof,
- a read only memory 303, or nonvolatile memory, or "ROM", suitable for storing nonvolatile data, for example cryptographic algorithms. Thus, the memory 303 stores a signature algorithm Sign and a cipher algorithm Enc. It likewise stores a token, or a means allowing said token to be obtained. The memory 303 is likewise suitable for storing in a protected area the secret keys that the authentication device shares with the entities to be authenticated. By way of example, the memory stores a first secret key $K_1$ that is shared with the first entity to be authenticated, and a second secret key $K_2$ that is shared with the second entity to be authenticated.

The authentication device 30 likewise accommodates an application in the form of a program that is capable of implementing the steps of the method of the invention that are executed by the device. To this end, the device 30 likewise comprises:
- sending means 304, designed to send the first entity to be authenticated an authentication request message that comprises a challenge Chal,
- calculation means 305, designed to calculate an expected authentication response Res. To do this, during operation, the device 30 applies the cipher algorithm Enc parameterized by the stored second secret key $K_2$ to a data item obtained by concatenation of a first value with the token. The first value is obtained by applying the signature algorithm parameterized by the shared first secret key $K_1$ to the challenge Chal. The calculation means 305 are suitable for implementing step E8, for calculating an expected response, of the authentication method described previously.
- reception means 306, designed to receive from the second entity a response message for the authentication request, sent by the sending means 304, for the challenge. The reception means 306 are designed to implement reception step E7 of the authentication method described previously,
- comparison means 307, designed to compare the authentication response received from the second entity with the authentication result calculated by the calculation means 305. The comparison means 307 are suitable for implementing comparison step E9 of the authentication method described previously,
- analysis means 308, designed to identify the source of an authentication error detected by the comparison means 307. The analysis means 308 comprise:
  - deciphering means 308-1, designed to decipher the authentication response $Res_2$ received from the second entity using the shared second secret key $K_2$. The deciphering means 308-1 are suitable for implementing deciphering step E11 of the authentication method,
  - means 308-2 for verifying the token, designed to verify that the token known to the authentication device 30 is included in the authentication response deciphered by the deciphering means 308-1. The means 308-2 are suitable for implementing step E12, for verifying the token, of the authentication method described previously,
  - signature verification means 308-3, designed to verify that the first part of the deciphered authentication response is indeed compliant with a signature for the challenge using the Sign algorithm parameterized by the first secret key $K_1$. The means 308-3 are suitable for implementing signature verification step E13 of the authentication method described previously.

The sending means 304, the calculation means 305, the reception means 306, the comparison means 307, the analysis means 308 that comprise the deciphering means 308-1, the means 308-2 for verifying the token and the signature verification means 308-3 are preferably software modules comprising software instructions for executing the corresponding steps of the method described previously using the authentication device 30. The software modules can be stored in, or transmitted by, a data storage medium. The latter may be a hardware storage medium, for example a CD-ROM, a magnetic memory, or else a transmission medium such as a signal or a telecommunication network.

A particular example of a set 40 of two entities that is suitable for being authenticated by an authentication device 30 as described previously will now be described with reference to FIG. 3.

Figure 3:
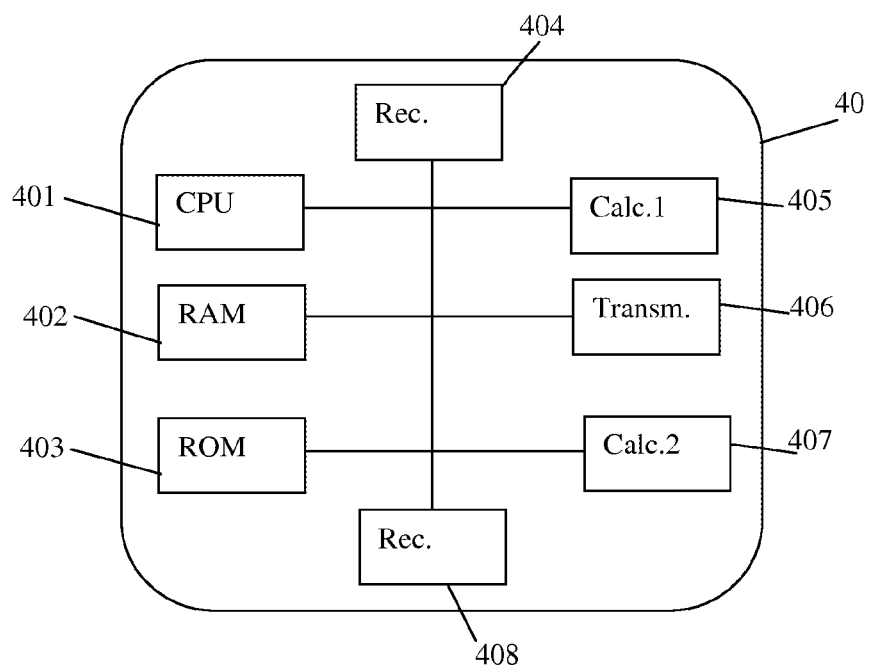
FIG. 3 shows a particular example of a group of two entities that is capable of implementing the method from FIG. 1.

This set 40 comprises a first entity and a second entity, which are not shown in FIG. 3.

The set of entities comprises:
- a processing unit 401, or CPU. It is understood that each of the two entities has a processing unit that is its own. This CPU set is represented in FIG. 3 by the processing unit 401. The processing unit is linked to a plurality of memories:
- a random access memory 402, or RAM memory, suitable for allowing performance of calculations, loading of instructions and execution of the latter. Here again, it is understood that each entity has a RAM memory that is its own. The set of these RAM memories is represented by the memory 402,
- a nonvolatile memory 403, or ROM memory, suitable for storing nonvolatile data, for example cryptographic algorithms. It is understood that each entity has such a memory. However, the set of the memories of the entities is represented by a single ROM memory 403. The memory 403 stores cryptographic algorithms, particularly the signature algorithm Sign suitable for calculating the authentication value and the cipher algorithm Enc suitable for calculating the authentication response $Res_2$. It also stores a token, or a means allowing this token to be obtained. The memory 403 likewise stores secret keys shared with the authentication device in a secure area. In particular, it stores a shared first secret key $K_1$ and a shared second secret key $K_2$, reception means 404, designed to receive from the authentication device an authentication request message comprising a challenge. The reception means 404 implement step E1, for receiving a challenge, of the authentication method described previously, first calculation means 405, designed so that the first entity in the set uses the first secret key $K_1$ to calculate an authentication value using the signature algorithm Sign applied to the challenge received by the reception means 404. The first calculation means 405 are suitable for implementing step E2, for calculating an authentication value, of the method of the invention, transmission means 406, designed so that the first entity transmits the authentication value calculated by the calculation means 405 to the second entity in the set. The transmission means 406 are suitable for implementing step E3, for sending the authentication value, of the authentication method, second calculation means 407, designed so that the second entity calculates an authentication response $Res_2$ by applying the cipher algorithm Enc parameterized by the second secret key $K_2$ to the authentication value calculated by the first entity in the set. The second calculation means 407 are suitable for implementing step E5, for calculating an authentication response, of the method described previously, sending means 408, designed to send the authentication device a response message that comprises the authentication response calculated by the second calculation means 407. The sending means are suitable for implementing step E6 for sending the authentication response.

The reception means 404, the first calculation means 405, the transmission means 406, the second calculation means 407 and the sending means 408 are preferably software modules comprising software instructions for executing the steps of the method described previously using the set made up of the two entities. The software modules can be stored in, or transmitted by, a data storage medium. The latter may be a hardware storage medium, for example a CD-ROM, a magnetic memory or even a transmission medium such as a signal or a telecommunication network.

The invention also relates to an authentication system comprising an authentication device 30 and a set 40 of at least two entities.

The invention claimed is:

1. A method for authenticating a first entity and a second entity by using a third entity, said first and third entities sharing a first secret key, said second and third entities sharing a second secret key, wherein the method comprises steps of:
    the third entity sending to the first entity a challenge,
    the first entity using the first secret key to calculate an authentication value on the basis of the received challenge,
    the first entity sending the second entity the calculated authentication value,
    the second entity using a cipher algorithm parameterized by the second secret key to calculate an authentication response, on the basis of a token that is known to the third entity and to the second entity and on the basis of the authentication value received from the first entity,
    the second entity sending to the third entity the authentication response,
    the third entity using the first and second secret keys to calculate an expected authentication response, on the basis of the token and the challenge, and
    the received authentication response being compared with the calculated expected authentication response.

2. The method as claimed in claim 1, comprising, if the received authentication response is not equal to the calculated response, the following steps implemented by the third entity:
    deciphering the received authentication response using the second secret key,
    verifying that the deciphered response comprises the token.

3. The method as claimed in claim 2, comprising, if the verifying is positive:
    calculation of an expected value on the basis of the challenge and the first secret key, and verification that the deciphered response comprises the expected value.

4. The method as claimed in claim 1, in which the token comprises a plurality of padding bits.

5. The method as claimed in claim 1, in which the token comprises part of the challenge.

6. A method for authenticating a first and a second entity by using a third entity, said first and third entities sharing a first secret key, said second and third entities sharing a second secret key, wherein the method comprises steps of:
    a challenge being sent to the first entity,
    a cipher algorithm, which is parameterized by the second secret key, being used to calculate an expected authentication response, on the basis of a token that is known to the third entity and to the second entity, and a signature for the challenge using the first secret key,
    a response to said challenge being received from the second entity, and
    the received response being compared with the calculated authentication response.

7. A method for authenticating a group made up of at least two entities with a third entity, the third entity and a first entity from the group sharing a first secret key, the third entity and a second entity from the group sharing a second secret key, wherein said method comprises steps of:
    a challenge being received from the third entity,
    the first entity from the group using the first secret key to calculate an authentication value on the basis of the received challenge,
    the first entity sending to the second entity from the group the calculated authentication value,
    the second entity from the group using a cipher algorithm parameterized by the second secret key to calculate an authentication response, on the basis of a token that is known to the third entity and to the second entity and on the basis of the authentication value received from the first entity, and
    the second entity from the group sending to the third entity the calculated authentication response.

8. An authentication device configured to authenticate a first and a second entity, said device sharing a first secret key with the first entity, and a second secret key with the second entity, wherein said device comprises:
    sending means for sending a challenge to the first entity,
    calculation means for calculating, using a cipher algorithm, which is parameterized by the second secret key, an expected authentication response, on the basis of a token that is known to the authentication device and to the second entity, and a signature for the challenge using the first secret key,
    reception means for receiving a response to said challenge from the second entity, and
    comparison means for comparing the received response with the calculated authentication response.

9. A system comprising:
    set of two entities comprising a first and a second entity, said set being configured for being authenticated by an authentication device, the authentication device sharing a first secret key with the first entity and a second key with the second entity, wherein said set comprises:

reception means for receiving a challenge from the authentication device, first calculation means configured so that the first entity from the set uses the first secret key to calculate an authentication value on the basis of the challenge, transmission means configured so that the first entity transmits the authentication value to the second entity from the group, second calculation means configured so that the second entity uses a cipher algorithm parameterized by the second secret key to calculate an authentication response, on the basis of a token that is known to the authentication device and to the second entity and on the basis of the authentication value received from the first entity in the set, and sending means for sending to the authentication device the calculated authentication response.

10. The system of claim 9, further comprising:
the authentication device.

11. A non-transitory data storage medium comprising a computer program stored thereon and able to be loaded into the internal memory of an authentication device, the program comprising code portions for executing steps of a method for authenticating a first and a second entity by using the authentication device, when the program is executed on said authentication device, said first and third entities sharing a first secret key and said second and third entities sharing a second secret key, wherein the method comprises:

sending a challenge from the authentication device to the first entity, using a cipher algorithm that is parameterized by the second secret key to calculate an expected authentication response on the basis of a token that is known to the authentication device and to the second entity, and a signature for the challenge using the first secret key, receiving a response to said challenge from the second entity, and comparing the received response with the calculated authentication response.

* * * * *